(12) United States Patent
Chowdhary et al.

(10) Patent No.: US 10,956,249 B2
(45) Date of Patent: Mar. 23, 2021

(54) HANDLING CLOCK ERRORS ON FAILURE OF INTERRUPT MECHANISM

(71) Applicant: International Business Machines Corporation, Armonk, NY (US)

(72) Inventors: Manish Kumar Chowdhary, Bangalore (IN); Venkatesh Sainath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/202,520

(22) Filed: Nov. 28, 2018

(65) Prior Publication Data

US 2020/0167222 A1 May 28, 2020

(51) Int. Cl.
*G06F 11/00* (2006.01)
*G06F 11/07* (2006.01)
*G06F 1/04* (2006.01)

(52) U.S. Cl.
CPC ...... *G06F 11/0772* (2013.01); *G06F 11/0721* (2013.01); *G06F 11/0757* (2013.01); *G06F 1/04* (2013.01)

(58) Field of Classification Search
CPC .... G06F 11/0772; G06F 11/1604; G06F 1/04; G06F 11/3055
See application file for complete search history.

(56) References Cited

U.S. PATENT DOCUMENTS

| | | | | |
|---|---|---|---|---|
| 5,081,629 A | * | 1/1992 | Criswell | G06F 1/04 708/532 |
| 6,543,027 B1 | * | 4/2003 | Hughes | G11C 7/1018 327/20 |
| 10,379,927 B2 | * | 8/2019 | Sanders | G06F 11/0736 |
| 2007/0230647 A1 | * | 10/2007 | Pourbigharaz | H04L 7/0083 375/371 |
| 2008/0126854 A1 | * | 5/2008 | Anderson | G06F 11/2028 714/13 |
| 2013/0038352 A1 | * | 2/2013 | Gupta | H03K 5/19 327/20 |
| 2015/0033101 A1 | * | 1/2015 | Chebruch | G06F 11/0751 714/798 |
| 2016/0147545 A1 | * | 5/2016 | Jain | G06F 11/3024 713/100 |
| 2018/0121280 A1 | * | 5/2018 | Sanders | G06F 11/0757 |

FOREIGN PATENT DOCUMENTS

CN 104796213 B 4/2017

* cited by examiner

*Primary Examiner* — Jonathan D Gibson
(74) *Attorney, Agent, or Firm* — Brian D. Welle (57) ABSTRACT

A system includes processing circuits configured to run workloads, a clock generation circuit configured to generate a reference clock signal for processing circuits, and a control processing circuit configured to manage interrupts, such as interrupts relating to the reference clock signal. The processing circuits are configured to generate interrupts in response to detecting a reference clock signal error.

20 Claims, 4 Drawing Sheets

HANDLING CLOCK ERRORS ON FAILURE OF INTERRUPT MECHANISM

BACKGROUND

The present disclosure relates to computing clock signal management, and specifically relates to reference clock management across a computing device that includes a plurality of processing circuits. In some computing devices, a reference clock as generated by a clock generation may be used to synchronize actions across the computing device. For example, a computing device may include a plurality of circuits that each are configured to execute actions at different times relative to each other using a single shared reference clock. Configuring circuits to execute actions at different times relative to a single shared reference clock may eliminate sources of error that may occur as a result of computing actions being executed in an improper or otherwise unintended order.

SUMMARY

According to embodiments of the present disclosure, a system includes one or more processing circuits configured to run workloads. The system further includes a clock generation circuit that is electrically coupled to each of the one or more processing circuits. The clock generation circuit is configured to generate a reference clock signal for the one or more processing circuits. The system further includes a control processing circuit that is electrically coupled to each of the one or more processing circuit and clock generation circuit. The control processing circuit is configured to manage a plurality of interrupts relating to the reference clock signal including a first and second interrupt. Each of the one or more processing circuits are configured to generate the first interrupt in response to detecting a first reference clock signal error. The clock generation circuit is configured to generate the second interrupt in response to detecting a second reference clock signal error.

According to other embodiments of the present disclosure, a method includes receiving, by a control processing circuit that is configured to manage interrupts of a computing device, an interrupt from a processing circuit of the computing device that is configured to execute a workload using a reference clock signal. The method further includes identifying, by the control processing circuit, that the interrupt relates to a reference clock signal error. The method also includes identifying, by the control processing circuit, a cause of the reference clock signal error. The method also includes executing a mitigating action relating to the cause.

According to other embodiments of the present disclosure, a processing circuit includes an input port configured to receive a reference clock signal. The processing circuit also includes a communication port configured to transmit and receive messages. The processing circuit also includes detection hardware configured to detect that the reference clock signal indicates an error condition. The processing circuit also includes on-board memory that includes a register for the error condition. The processing circuit also includes an interrupt generation circuit configured to generate an interrupt related to the error condition and transmit the interrupt via the communication port. The processing circuit is configured to execute workloads for a computing device using the reference clock signal The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described.

DETAILED DESCRIPTION

Aspects of the present disclosure relate to configurations and methods of a computing device that utilizes a reference clock for a synchronous circuit system, and more particular aspects relate to identifying errors of generating and distributing this reference clock signal across the circuits of the computing device. A computing device may include one or more control processing circuits configured to receive and process interrupts of the computing device, including interrupts related to such reference clock signals. Errors may occur at a plurality of locations within the computing device, such as at an interrupt generation circuit of the clock generation circuit or along a path between the clock generation circuit and the control processing circuit.

In certain examples, a computing device may include a completely redundant interrupt system that is configured to identify error conditions, generate interrupts, transmit interrupts, and handle interrupts in response to a "primary" interrupt system failing in the manner described above. For example, the computing device may include a redundant interrupt system that includes a backup control processing circuit coupled via an entirely separate path to the clock generation circuit. Further, the redundant interrupt system may include a backup interrupt generation circuit. Each component of the backup interrupt system may be substantially identical to the corresponding component of the primary interrupt system (e.g., such that both backup and primary components include and/or have access to substantially identical hardware, firmware, software, etc.). In this way, if such an error as described above occurs, the backup interrupt generation circuit may send an interrupt along the separate path to the backup control processing circuit to address the failure. While functional at providing a workaround for failures relating to interrupt generation and/or transmission between the clock generation circuit and the control processing circuit, such a computing device may require a substantial amount of space and extra components that may not be configured to provide any functionality outside of redundancy.

Alternatively, or additionally, aspects of this disclosure are related to computing devices that utilize other processing circuits that are primarily configured to execute workloads for the computing device to provide such redundancy. For example, processing circuits that are configured to execute workloads may also be configured to identify an error related to the received reference clock signal. Once identified, these processing circuits may be further configured to generate an interrupt for the control processing circuit. As such, in response to a failure at the clock generation circuit that impacts an ability for an interrupt to be transmitted between the clock generation circuit and the control processing circuit, the control processing circuit may still receive an interrupt through processing circuits that register this failure.

As a result of using existing processing circuits to provide this redundancy, the computing device may require fewer components and pathways, therein costing less money and taking less space. Further, where a computing device includes a plurality of processing circuits, the control processing circuit may have an improved ability to identify the cause of the failure as a result of having more data sources to gather data from (e.g., where each processing circuit may include unique and helpful information on the reference clock signal error). For example, configuring a computing device to utilize workload-executing processing circuits to provide such redundancy may provide an ability to isolate a failure of a pathway, as compared to a failure of the interrupt generation circuit or a failure of the clock generation circuit (e.g., by configuring a control processing circuit to determine which components are response following the response of an interrupt). While the present disclosure is not necessarily limited to such applications, various aspects of the disclosure may be appreciated through a discussion of various examples using this context.

Figure 1:
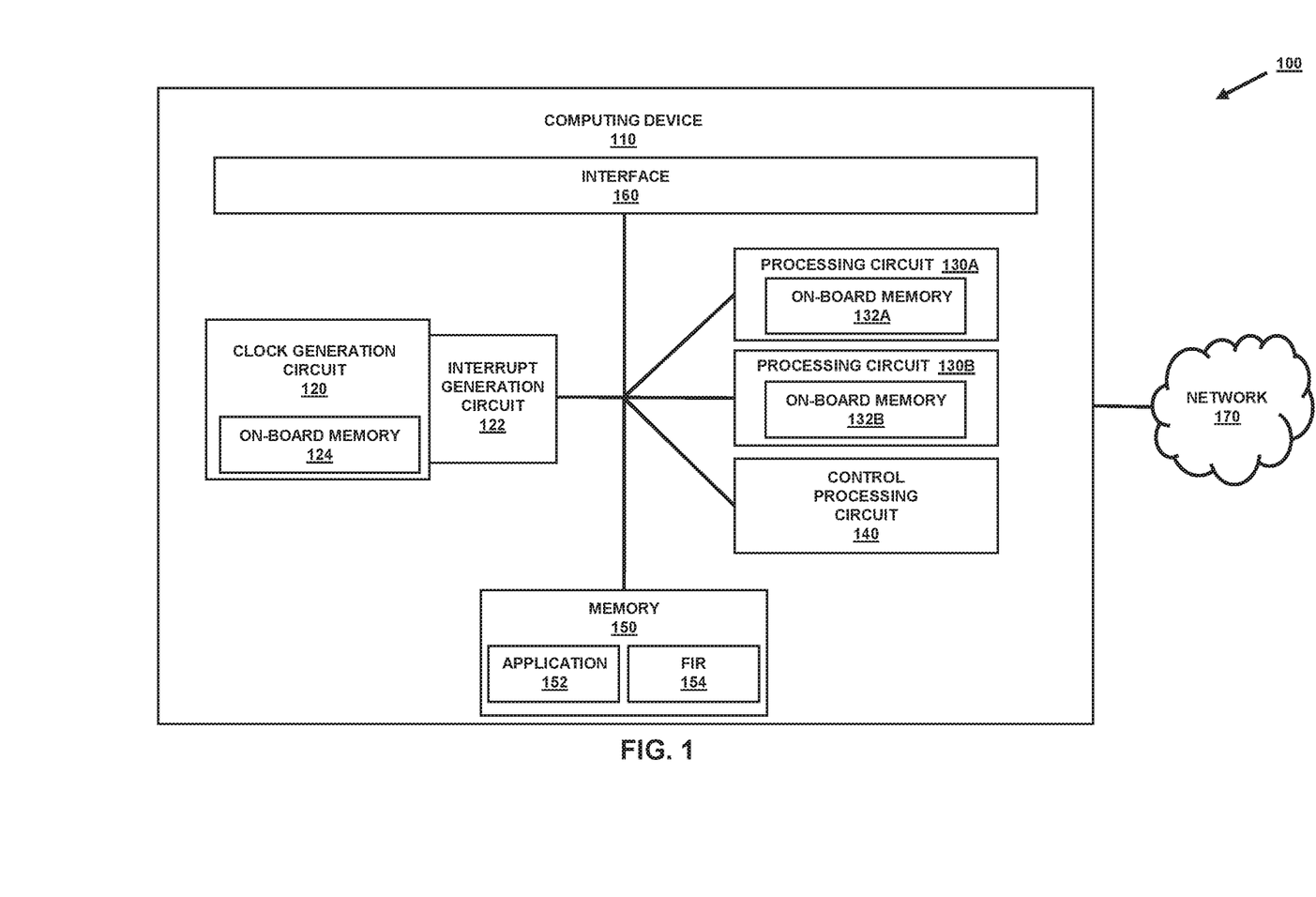
FIG. 1 depicts a conceptual and schematic diagram of an example computing device that utilizes a clock generation circuit to synchronize actions of processing circuit within the computing device.

FIG. 1 is a conceptual and schematic diagram of a system 100 that includes a computing device 110 that may utilize these techniques. Computing device 110 may be a server, laptop, desktop, cellular device, or the like. While computing device 110 is depicted as a single entity (e.g., within a single housing) for the purposes of illustration, in other example computing device 110 may include two or more discrete physical systems (e.g., within two or more discrete housings). Computing device 110 may include clock generation circuit 120, processing circuits 130A-130B (collectively, "processing circuits 130"), control processing circuit 140, memory 150, and interfaces 160. Computing device 110 may include any number or amount of clock generation circuit 120, processing circuits 130, memory 150, and/or interfaces 160.

As discussed herein, clock generation circuitry 120 may be configured to generate a reference clock signal. Clock generation circuit 120 may generate one or more reference clock signals. Clock generation circuit 120 may generate clock signal(s) for one or more processing circuits 130. Clock generation circuit 120 may include on-board memory 124. On-board memory may include random-access memory or the like. Clock generation circuit 120 may be configured to write to on-board memory 124. For example, on-board memory 124 may include an error register that registers errors identified by the clock generation circuit 120. In some examples, clock generation circuit 120 may create a record in on-board memory 124 prior to causing interrupt generation circuit 122 to generate and transmit an interrupt to control processing circuit 140.

Processing circuits 130 may include, for example, microprocessors, digital signal processors (DSPs), application specific integrated circuits (ASICs), field-programmable gate arrays (FPGAs), and/or equivalent discrete or integrated logic circuit. Two or more processing circuits 130 may be configured to work together using the reference clock signal to create a synchronous circuit system within processing circuits.

Processing circuits 130 may execute a series of workloads as a synchronous circuit system using a clock signal generated by clock generation circuit 120. Processing circuits 130 may execute workloads at predetermined times of clock signal or according to a predetermined order relative to the clock signal. As a result of using a clock signal to execute workloads, processing circuits 130 may improve an efficiency of computing device 110 executing a variety of computing operations. Further, as a result of using a clock signal to improve an efficiency of workload execution, a failure of the clock signal may have substantial negative effects, such that it is advantageous to improve means to detect, isolate, and correct such failures.

Processing circuits 130 (which in other examples may be understood to be host processors hosting the execution of workloads) may execute workloads according to instructions stored on memory 150 of computing device 110. Memory 150 may include a computer-readable storage medium or computer-readable storage device. In some examples, memory 150 may include one or more of a short-term memory or a long-term memory. Memory 150 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). Processing circuits 130 may execute workloads according to instructions of one or more applications 152 (e.g., software applications) stored in memory 150 of computing device 110. In some examples, applications 152 may communicate with one or more processing circuits 130 that are to execute the workloads in order to determine an order or relative time (in relation to the reference clock signal) in which processing circuits 130 are to execute the workloads.

As discussed above, computing device may include control processing circuit 140. Similar to processing circuits 130, control processing circuit 140 may include, for example, a microprocessor, a DSP, an ASIC, an FPGA, and/or an equivalent discrete or integrated logic circuit. Control processing circuit 140 may be configured to initialize computing device 110 and therein monitor, service, and/or control aspects of computing device 110. For example, computing device 110 may be configured to route interrupts to control processing circuit 140, in response to which control processing circuit 140 may address these interrupts. Control processing circuit 140 may monitor for interrupts for many and/or all hardware components of computing device 110. Control processing circuit 140 may be configured to enable processing circuits 130 to execute workloads. In some examples, control processing circuit 140 is not configured to execute a workload of computing device 110. Though only one control processing circuit 140 is depicted in FIG. 1 for purposes of clarity, in some examples computing device 110 may include a plurality of control processing circuits that are each in charge of initializing and therein enabling a subset of circuits of computing device 110.

As a control processing circuit (which in other examples may be referred to as a service processor), control processing circuit 140 may be configured to receive and manage interrupts that are related to the reference clock signal. Interrupts may relate to messages that indicate an event that requires substantially immediate attention. Interrupts may include hardware interrupts or software interrupts. In some examples, control processing circuit 140 receives an interrupt, control processing circuit 140 may halt some or all ongoing workloads in response to receiving an interrupt related to those ongoing workloads. Further, control processing circuit 140 may evaluate the interrupt prior to enabling other workloads to be executed by processing circuits 130, or address (e.g., execute an interrupt handler) the interrupt prior to enabling processing circuits to begin or finish the execution of other workloads, or the like. Put differently, control processing circuit 140 may interrupt the execution of the code that one or more processing circuits 130 are executing in response to control processing circuit 140 receiving an interrupt related to the execution of that code. Further, in response to receiving the interrupt, control processing circuit 140 may save a current state of some or all of computing device 110 prior to invoking (e.g., running a section of code related to) an interrupt handler (e.g., an interrupt service routine or ISR).

Interrupts may be sent to control processing circuit 140 by interrupt generation circuit 122. Interrupt generation circuit 122 may be integral with or otherwise coupled to other components or circuit of computing device 110. For example, interrupt generation circuit 122 may be integral with or coupled to clock generation circuit 120 as depicted in FIG. 1. In some examples (not depicted in FIG. 1), each or a plurality of processing circuits 130 may include or have access to a respective interrupt generation circuit 122. Interrupt generation circuit 122 may be configured to generate an interrupt that identifies and/or categorizes the event that caused the interrupt. For example, interrupt generation circuit 122 may generate an interrupt that identifies a failure of the hardware of the clock generation circuit 120.

In some examples, each or many of processing circuits 130 may include on-board memory 132A-132B (collectively, "on-board memory 132") as depicted in FIG. 1. On-board memory may include random-access memory or the like. Processing circuits 130 may be configured to write to on-board memory 132. For example, on-board memory 132 may include an error register that registers errors identified by the respective processing circuits 130. Processing circuits 130 may create a record in on-board memory 132 in response to detecting the reference clock signal error. In some examples, processing circuits 132 may create a record in on-board memory 132 prior to causing an interrupt generation circuit to generate and transmit an interrupt to control processing circuit 140.

Further, a record of errors (such as reference clock errors) may be created in a fault isolation register 144 (FIR 154). FIR 154 may be a register within memory 150. Additionally, or alternatively, FIR 154 may be stored within a memory of processing circuits 130, such as in a portion of on-board memories 132. FIR 154 may maintain a unique fingerprint of each error detected by processing circuits 130 and/or clock generation circuit 120. In some examples, error records within on-board memory 132 of processing circuits 132 and clock generation circuit 120 on-board memory 124 may be mapped to FIR 154. In certain examples, a plurality of records across a plurality of on-board memories 124, 132 may be recorded within FIR 154 as a single record. In other examples, each record in each on-board memory 124, 132 may be created as a unique record in FIR 154. In some examples, computing device 110 may include a plurality of FIRs 154 that each relate to one or more type of interrupt. For example, FIR 154 may relate exclusively or primarily to reference clock interrupts.

In some examples, processing circuits 130 may execute workloads according to instructions that originate from a source external to computing device 110. Interface 160 may enable components within computing device 110 (e.g., such as processing circuits 130) to communicate with entities external to computing device 110. In some examples, interface 160 may include a service data objects framework to ensure that processing circuits 130 within computing device 110 are accessed in a uniform manner and also themselves access external modules/data/components in a uniform way. Interface 160 may include one or more network interface cards, such as Ethernet cards, and/or any other types of interface devices that can send and receive information. Any suitable number of interfaces may be used to perform the described functions according to particular needs.

For example, interface 160 may enable one or more processing circuits 130 to receive a task or workload from an external computing device via network 170. Network 170 may include one or more private or public computing networks. For example, network 170 may comprise a private network (e.g., a network with a firewall that blocks non-authorized external access) that is associated with the workload. Alternatively, or additionally, network 170 may comprise a public network, such as the Internet. Although illustrated in FIG. 1 as a single entity, in other examples network 170 may comprise a combination of public and/or private networks.

As discussed above, in some examples a failure may relate to the interrupt generation circuit and/or the pathway between the interrupt generation circuit and the control processing circuit configured to handle interrupts. As discussed herein, a pathway may include a serial protocol to electrically couple components together for, e.g., integrated circuits. For example, a pathway may include inter-integrated circuit ($i^2c$) protocol, which enables a plurality of "slave" integrated circuits to communicate with one or more "master" integrated circuits. However, in other examples, other protocols or a plurality of protocols may be used for pathways.

Figure 2:
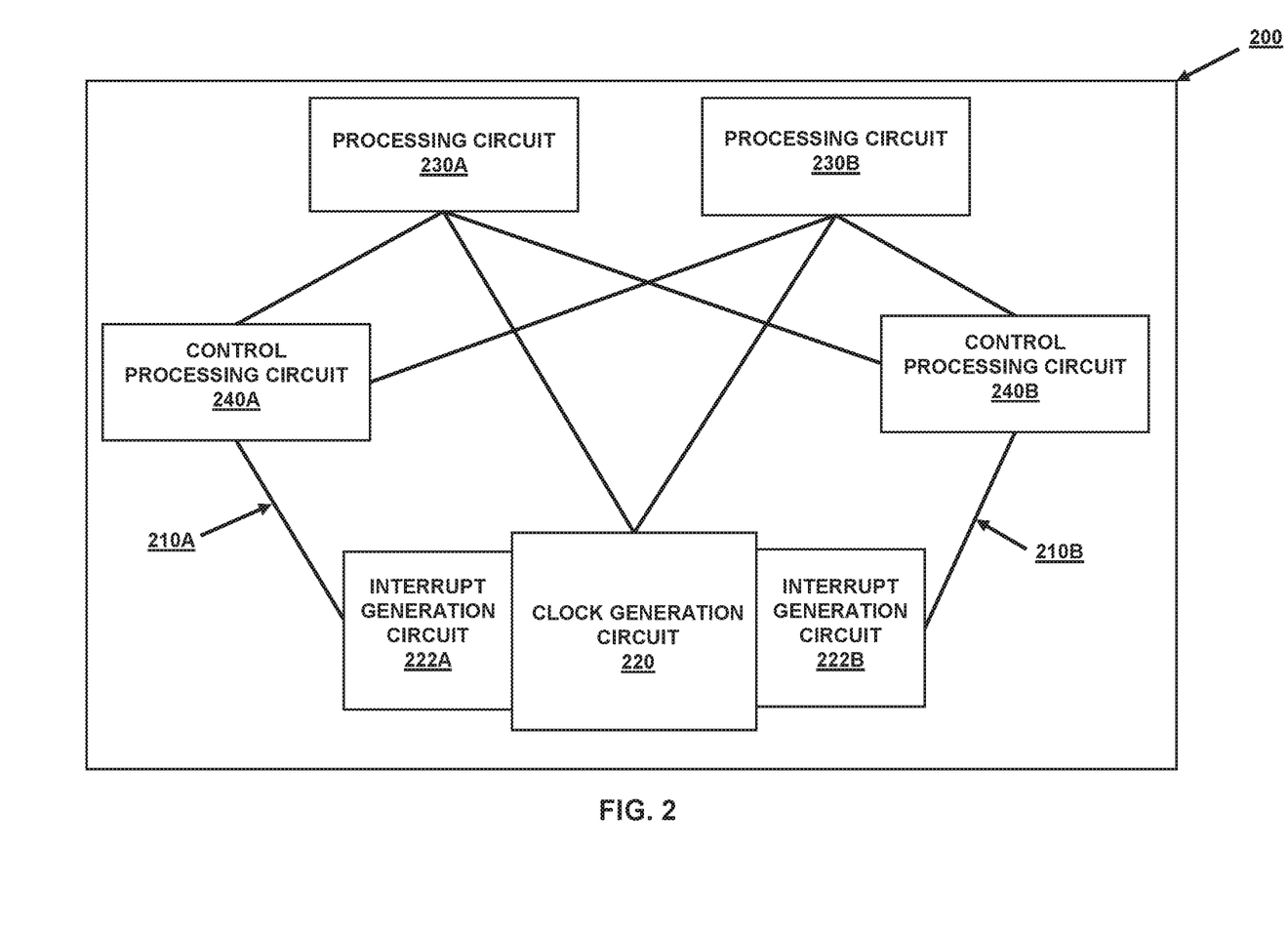
FIG. 2 depicts a conceptual and schematic diagram of a portion of a computing device configured to provide redundancy for managing a clock generation circuit.

As such, as depicted in FIG. 2, in certain examples computing devices such as computing device 200 may include separate redundant pathways 210A, 210B (collectively, "pathways 210") and separate redundant interrupt generation circuits 222A, 222B (collectively, "interrupt generation circuits 222") leading to separate control processing circuits 240A, 240B (collectively, "control processing circuits 240"). Control processing circuits 240 may be substantially similar to control processing circuit 140 and interrupt generation circuits 222 may be substantially similar to interrupt generation circuit 122, with the exception of any differences described herein for either. Interrupt generation circuits 222 may be integral with or coupled to clock generation circuit 220, which may be substantially similar to clock generation circuit 120 with the exception of any differences described herein. Control processing circuits 240 may be configured to initialize some or all of computing device 200 as well as to handle interrupts relating to the reference clock signal as created by clock generation circuit 220. Put differently, control processing circuits 240 may not be configured to execute workloads of computing device 200. Pathways 210 may lead from clock generation circuit 220 to respective control processing circuits 240.

Clock generation circuit 220 may generate a reference clock signal for a plurality of processing circuits 230A, 230B (collectively, "processing circuits 230") that are substantially similar to processing circuits 130 with the exception of any differences described herein. In some examples, some or all of processing circuits 230 may not include interrupt generation circuit similar to interrupt generation circuit 122, 222. Processing circuits 230 may be coupled to memory (e.g., similar to memory 150) and one or more interfaces (e.g., similar to interface 160 of FIG. 1) to enable processing circuits 230 to receive and execute workloads. In some examples computing device 200 may include a pathway between some or all of processing circuits 230 and control processing circuits 240 over which control processing circuits 240 may access data of processing circuits 230. In other examples (e.g., for low-end systems), it may be difficult or impossible for control processing circuits 240 to access all data of processing circuits 230 (e.g., such as data stored on on-board memories of the respective processing circuits 230) over the provided pathways of computing device 200.

One control processing circuit 240A of control processing circuits 240 may be a primary control processing circuit that is configured to initially handle interrupts, while the other control processing circuit 240B of control processing circuits 240 may be a backup control processing circuit that handles interrupts if the primary control processing circuit 240A cannot handle interrupts (e.g., due to a failure of pathway 210A or interrupt generation circuit 222A or the like). Put differently, all of the functionality of interrupt generation circuit 222A, pathway 210A, and primary control processing circuit 240A may be replicated by interrupt generation circuit 222B, pathway 210B, and backup control processing circuit 240B. This may include a replication in firmware supporting respective control processing circuits 240 in managing interrupts. As such, in the event of an interrupt failing to reach a monitoring function in primary control processing circuit 240A, computing device 200 may execute a failover to send a new interrupt generated by interrupt generation circuit 222B along pathway 210B to backup control processing circuit 240B. At this time, programs running on backup control processing circuit 240B may take over (e.g., take over for primary control processing circuit 240A) as backup control processing circuit monitors for interrupts.

As would be understood by one of ordinary skill in the art, computing device 200 includes a relatively substantial investment in redundant components and failover components, each of which include an independent cost and require an amount of space within computing device 200. Further, in examples where a failure occurs in clock generation circuit 220 itself (e.g., rather than in interrupt generation circuit 222A or pathway 210A) it may be difficult or impossible to identify, isolate, and/or address such a failure.

Figure 3A:
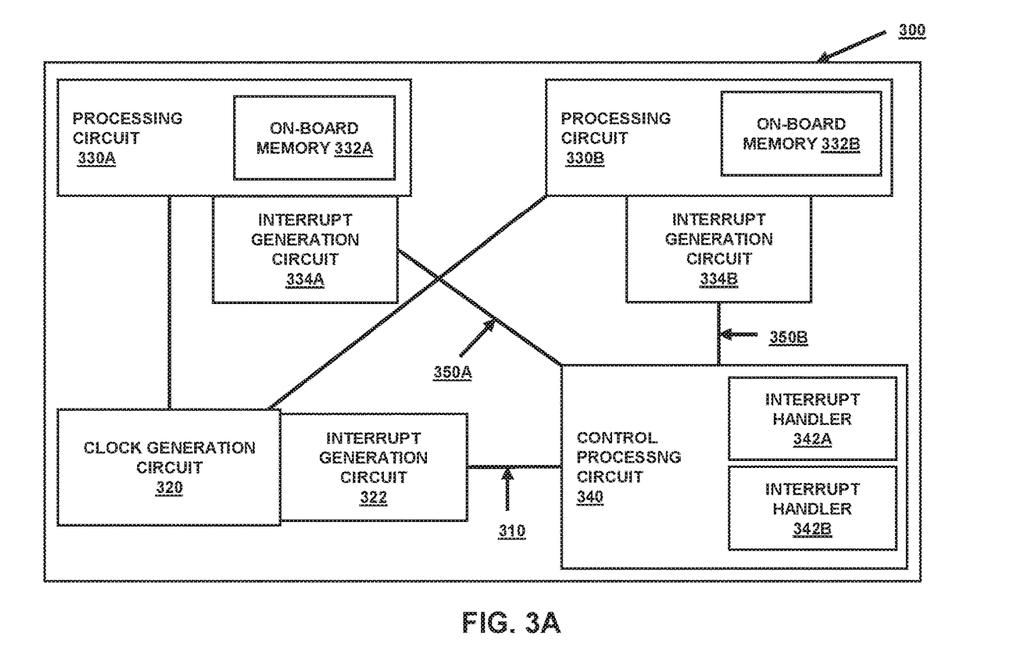
FIG. 3A depicts a conceptual and schematic diagram of a portion of a computing device configured to provide redundancy for managing a clock generation circuit.
Figure 3B:
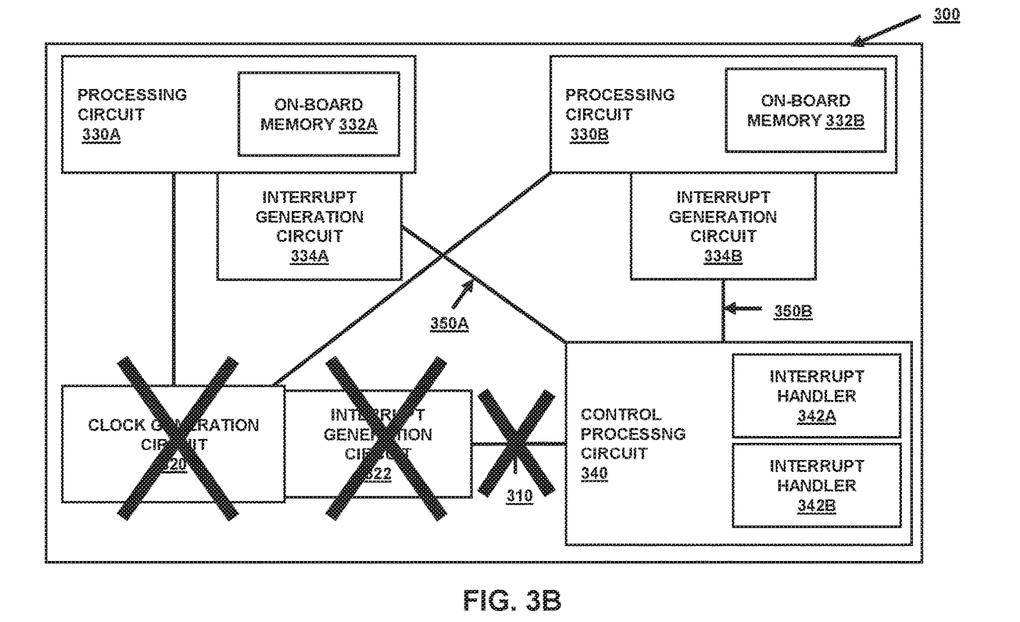
FIG. 3B depicts a conceptual and schematic diagram of a failure of the path between the clock generation circuit and the control processing circuit of FIG. 3A.

As such, aspects of this disclosure relate to using processing circuits that are configured to execute workloads for a computing device to function as a redundant control processing circuit. For example, FIGS. 3A and 3B are conceptual and schematic diagrams of a computing device 300 that configures processing circuits 330A, 330B (collectively "processing circuits 330") to function as a redundant interrupt facility. Though FIGS. 3A and 3B depicts two processing circuits 330 configured to function as a redundant interrupt facility, in other examples computing devices may include one or more than two processing circuits 330.

Computing device 300 includes clock generation circuit 320 which may be substantially similar to clock generation circuit 120, 220 with the exception of any differences described herein. Clock generation circuit 320 may be integral with or coupled to interrupt generation circuit 322, which may be substantially similar to interrupt generation circuit 122, 222 with the exception of any differences described herein. Interrupt generation circuit 322 may be coupled through pathway 310 to control processing circuit 340, which may be substantially similar to control processing circuits 140, 240 with the exception of any differences described herein. Clock generation circuit 320 may be configured to generate a clock signal for a plurality of processing circuits 330 that are configured to execute workloads for computing device 300 and may be substantially similar to processing circuits 130, 230 with the exception of any differences described herein.

As depicted in FIG. 3A, processing circuits 330 each include a respective interrupt generation circuit 334A, 334B (collectively, "interrupt generation circuit 334"). Interrupt generation circuit 334 may be substantially similar to interrupt generation circuits 122, 222. Interrupt generation circuits 334 may be integral with or coupled with respective processing circuits 330. Each of processing circuits 330 may be coupled to control processing circuit 340 through a respective pathway 350A, 350B (collectively, "pathways 350").

During operation, interrupt generation circuit 322 may generate interrupts relating to, e.g., clock generation circuit 320 hardware. Interrupt generation circuit 322 may send interrupts it generates to control processing circuit 340 along pathway 310. Further, computing system 300 may create a record within a FIR of computing device 300 (e.g., similar to FIR 154 of FIG. 1) for each interrupt that interrupt generation circuit 322 transmits. Further, as discussed above, clock generation circuit 320 may include on-board memory (not depicted) similar to on-board memory 124 of FIG. 1 within which clock generation circuit 320 records data of failures. Similarly, as discussed above, control processing circuit 340 may address the interrupt using data of the interrupt, data of the on-board memory of clock generation circuit 320, and/or data from the FIR.

As discussed herein, processing circuits 330 may both include detection hardware 336A, 336B (collectively, "detection hardware 336"). Detection hardware 336 may be configured to detect error conditions such as error conditions on the incoming reference clock signal from clock generation circuit 320. Detection hardware 336 may include a series of logic gates that together detect the error conditions. Detection hardware 336 may be located close to the respective input port 338A, 338B (collectively, "input ports 338") of processing circuits 330. Input ports 338 may be configured to receive at least the reference clock signal from clock generation circuit 320.

In some examples, as depicted in FIG. 3B, it may be difficult or impossible for an interrupt to be transmitted from clock generation circuit 320 to control processing circuit 340. For example, the failure may make it difficult or impossible for an interrupt to be transmitted due to a failure of pathway 310 and/or interrupt generation circuit 322. Further, even it transmitted, the failure may make it difficult or impossible for computing device 300 to gather and/or transmit data of the failure to a FIR, such that it may be difficult or impossible for control processing circuit 340 to identify a cause of the failure due to a lack of data in the FIR and/or a lack of an ability to access an on-board memory of clock generation circuit 320 to gather data.

As such, as discussed herein, one or more processing circuits 330 may provide an interrupt to control processing circuitry 340. Processing circuits 330 may provide the interrupt with respective interrupt generation circuits 334A, 334B (collectively, "interrupt generation circuits 334"). Interrupt generation circuits 334 may be located on processing circuits 330. For example, interrupt generation circuits 334 may be located adjacent respective communication ports 339A, 339B (collectively, "communication ports 339") that are configured to be coupled to control processing circuit 340 via, e.g., an i²c protocol. Processing circuits 330 may be configured to detect a plurality of error conditions as discussed herein using detection hardware 336. Further, processing circuits 330 may be configured to cause interrupt generation circuit 334 to generate a respective interrupt in response to detection hardware 336 detecting many or all of these detected error conditions. In some examples, detection hardware 336 is configured to cause the interrupt generation circuit 334 to generate the interrupt in response to detecting the error condition and/or in response to determining that a FIR of the computing device 300 has been updated to include a record of the error condition.

For example, detection hardware 336 of processing circuits 330 may be configured to detect an error condition related to the reference clock signal not arriving from clock generation circuit 320, or processing circuits 330 may be configured to detect an error condition relating to the reference clock signal being scrambled or otherwise unusable. In some examples, detection hardware 336 may be configured to cause interrupt generation circuit 334 to transmit interrupt upon detection hardware 336 detecting the error condition (e.g., as a result of other functionality of processing circuits 330 being impaired by the error condition). Further, in some examples detection hardware 336 may be configured to create a record of the error condition in on-board memory 332 as described herein. Put differently, in some examples processing circuits 330 are configured such that detection hardware 336 is enabled to detect the error condition, record the error condition in on-board memory 332, and cause interrupt generation circuit 334 to transmit the interrupt independently via hardware rather than, e.g., firmware, in order to improve an ability of processing circuits 330 to execute this functionality in the absence of the reference clock signal (e.g., which may be down or otherwise impaired due to the error condition).

In response to detecting an error condition, a respective processing circuit 330 may create a record of the detected error condition. Processing circuits 330 may be configured to create a record of the detected error condition on the respective on-board memory 332A, 332B (collectively, "on-board memory 332"). Further, computing device 300 may configured to map one or all of these detected error conditions to the global FIR for the computing device 300. On-board memory 332 may be substantially similar to on-board memory 132 with the exception of any differences described herein. Processing circuits 330 may be configured to create the record of the detected error condition on on-board memory 332 prior to causing respective interrupt generation circuits 334 to generate an interrupt. Similarly, computing device 300 may map error conditions of on-board memory 332 to the FIR prior to interrupt generation circuits 334 transmitting the interrupt.

Once control processing circuit 340 receives the interrupt, control processing circuit 340 may investigate the interrupt. For example, control processing circuit 340 may utilize interrupt handlers 342A, 342B (collectively, interrupt handlers 342) to investigate the interrupt. Interrupt handlers 342 may include a portion of firmware and/or hardware that is configured to identify a nature of an interrupt and identify whether the interrupt is caused by one or more of a plurality of potential causes. In some examples, these causes are predetermined, such that in response to any interrupt the respective interrupt handler 342 may identify whether the interrupt is caused by the same predetermined set of circumstances. In this way, interrupt handlers may include functionality of control processing circuit 340 that is configured to identify an underlying cause of an interrupt and take a mitigating action.

A mitigating action may include fixing an error (e.g., by causing a process to restart), causing a failover to a redundant component, halting one or more associated processes that may be affected by the identified cause of the interrupt, and/or sending an alert to an administrator relating to the interrupt (e.g., requesting that a component be replaced). In some examples, control processing circuit 340 may be configured to utilize an interface (e.g., such as interface 160) to transmit an alert or message to an administrator relating to the error condition.

As depicted in FIGS. 3A and 3B, control processing circuit 340 may include a plurality of interrupt handlers 342. In such examples, each of interrupt handlers 342 may be configured to handle interrupts relating to different components. For example, interrupt handler 342A may be a chip interrupt handler that is configured to handle interrupts relating to failures of processing circuits 330, while interrupt handler 342B may be a clock interrupt handler configured to handle interrupts related to failures of clock generation circuit 320.

For example, as depicted in FIG. 3B, computing device 300 may encounter a failure that impacts clock generation circuit 320 as well as at least one of pathway 310 or interrupt generation circuit 322, such that control processing circuit 340 does not receive an interrupt from clock generation circuit 320. As a result of this failure, processing circuit 330A and processing circuit 330B may not receive the reference clock signal from clock generation circuit 320. Both processing circuits 330 may identify this failure to receive the reference clock signal and create a record of this in respective on-board memories 332 of the respective processing circuits 340. Further, at least one of processing circuits 340 may create a record of this error in the global FIR of computing device 300.

In some examples, computing device 300 may be configured such that only one record is created in FIR, even if numerous local records are created across respective on-board memories 332. For example, records may be created in FIR such that only type of record may be created for one type of instance for a given time period, such that a second processing circuit 330B may be denied access to create a FIR record for an error that a first processing circuit 330A already created a FIR record for. Alternatively, computing system 300 may be configured to automatically map error records within on-board memories 332 to FIR, compiling similar error records together while doing so. Other means of ensuring that only a single FIR record is created are also possible. Alternatively, the FIR may be configured such that the FIR may store multiple records for the same cause as detected by numerous processing circuits 330.

Figure 4:
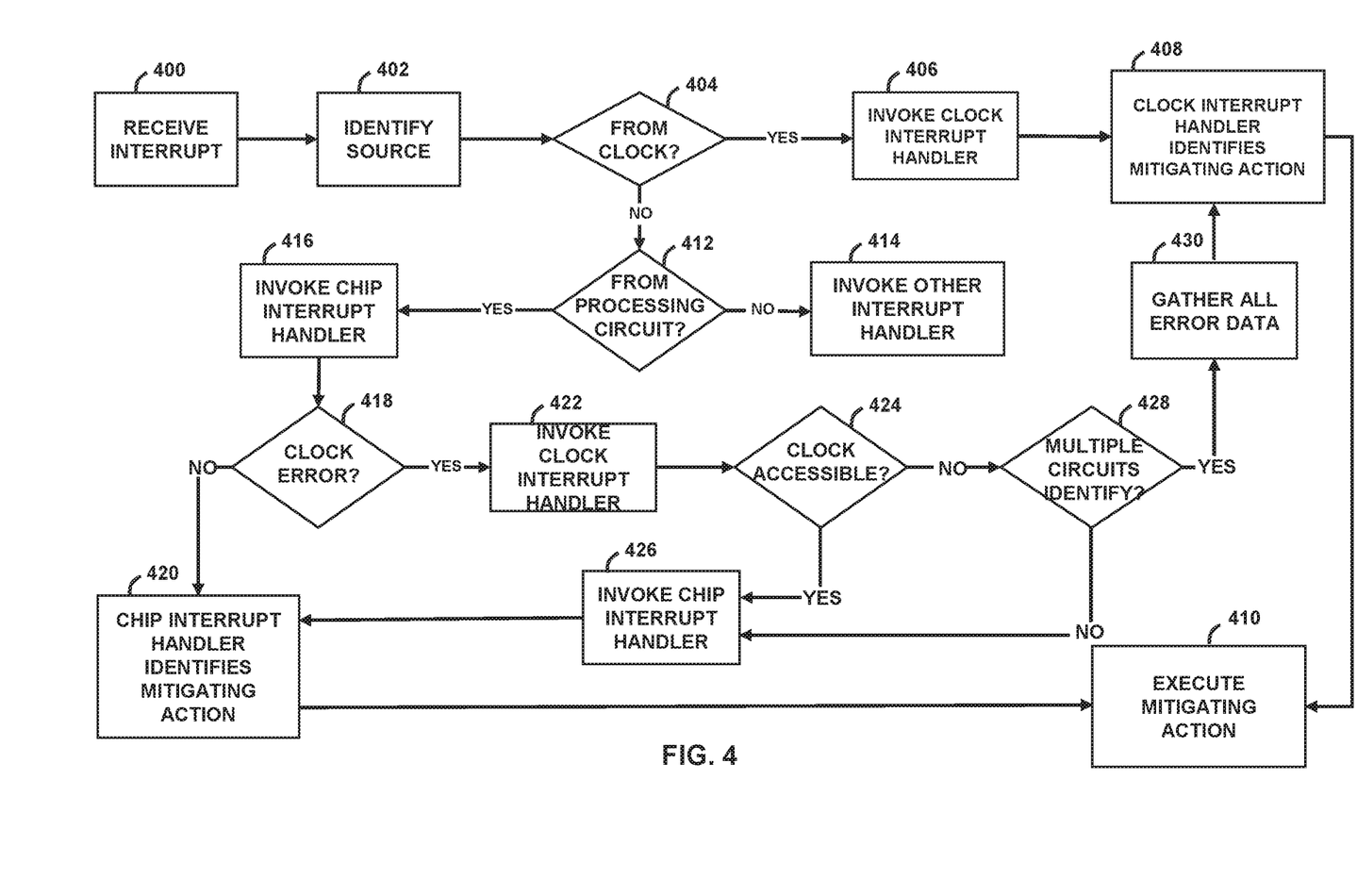
FIG. 4 is a flowchart of an example method that the control processing circuit may execute in identifying a clock signal generation and/or distribution error.

Once processing circuits 330 create the local and global record(s), interrupt generation circuits 334 may generate interrupts and transmit the interrupts along pathways 350 to control processing circuit 340. Control processing circuit 340 may execute one or more processes to handle the received interrupts. For example, FIG. 4 depicts a flowchart of control processing circuit 340 managing interrupts. Though the flowchart of FIG. 4 is discussed in relation to the computing device 300 of FIGS. 3A and 3B, it is to be understood that the procedures of the flowchart may be executed by other computing devices in other examples, and it is to be further understood that computing device 300 of FIGS. 3A and 3B may execute procedures other than the flowchart depicted in FIG. 4.

Control processing circuit 340 may receive an interrupt (400). Control processing circuit 340 may identify the source of the interrupt (402). Control processing circuit 340 may identify the source of the interrupt using metadata of the interrupt. For example, control processing circuit 340 may determine if the interrupt is from clock generation circuit 320 (404). When control processing circuit 340 identifies the source of the interrupt as the reference clock generation circuit 320, control processing circuit 340 invokes clock interrupt handler 342B (406). Invoking clock interrupt handler 342B may include running a block of firmware that relates to clock generation circuit 320. Clock interrupt handler 342B may identify a mitigating action (408). Clock interrupt handler 342B may identify the mitigating action by analyzing the interrupt and/or analyzing the clock generation circuit 320 itself. Once clock interrupt handler 342B identifies the mitigating action, control processing circuit 340 executes the mitigating action (410). Executing the mitigating action may include executing a failover to one or more redundant components, rebooting one or more failing processes, creating an alert for an administrator, ordering a spare part, or the like.

As part of the identifying the source of the interrupt (402), control processing circuit 340 may identify if the interrupt is from one of processing circuits 330 (412). Where the source is from neither clock generation circuit 320 nor any of processing circuits 330, control processing circuit 340 may invoke another interrupt handler (414). For example, control processing circuit 340 may invoke an interrupt handler that relates to this other source or control processing circuit 340 may invoke an interrupt handler that relates to other general interrupts. Alternatively, as discussed herein, control processing circuit 340 may identify that the interrupt is from one of processing circuits 330, in response to which processing circuit 340 may invoke chip interrupt handler 342A (416). Similar to clock interrupt handler 342B, invoking chip interrupt handler 342A may include running a block of firmware that relates to processing circuit 330 interrupts.

Chip interrupt handler 342A may determine whether the interrupt relates to a reference clock generation circuit 320 error (418). For example, chip interrupt handler 342A may check a FIR of computing device 300 (e.g., such as a FIR 154 of memory 150 of FIG. 1) to identify if the interrupt relates to a clock error. Alternatively, or additionally, chip interrupt handler 342A may analyze data within interrupt to determine whether the interrupt relates to a clock error. Alternatively, or additionally, chip interrupt handler 342A may analyze data of on-board memory 332 of the processing circuit 330 that sent the interrupt to determine whether an error register of on-board memory 332 details the interrupt as relating to a clock error. Other means of determining whether the interrupt relates to a clock error are also possible. If chip interrupt handler 342A determines that the interrupt does not deal with a clock error, chip interrupt handler 342A may identify a mitigating action to address the processing circuit 330 registering an error (420). Upon chip interrupt handler 342A identifying the mitigating action, control processing circuit 340 may execute the mitigating action as described herein.

In other examples, chip interrupt handler 342A may analyze the interrupt as described above and determine that the interrupt does relate to a clock error (418). In response to chip interrupt handler 342A determining that the interrupt does relate to a clock error, control processing circuit 340 may invoke the clock interrupt handler 342B (422). Clock interrupt handler 342B may determine whether clock generation circuit 320 is accessible (424). Determining whether clock generation circuit 320 is accessible may include determining whether pathway 310, interrupt generation circuit 322, and/or an on-board memory (e.g., similar to on-board memory 124 of FIG. 1) of clock generation circuit 320 are functioning and/or include a record of an error condition. For example, clock interrupt handler 342B may attempt to send a signal to interrupt generation circuit 322 and/or to clock generation circuit 320 and determine that the clock generation circuit 320 is accessible if clock interrupt handler 342B receives an appropriate response from interrupt generation circuit 322 and/or clock generation circuit 320. Alternatively, or additionally, clock interrupt handler 342B may access the on-board memory of clock generation circuit 320 and determine that there is no record of an error-condition to determine that clock generation circuit 320 is accessible, and/or clock interrupt handler 342B monitor the reference clock signal as generated by clock generation circuit 320 for some amount of time to determine that clock generation circuit 320 is accessible.

Where clock interrupt handler 342B determines that clock generation circuit 320 is accessible, control processing circuit 340 may invoke chip interrupt handler 340A (426) to analyze the respective processing circuit(s) 330 that sent the interrupt to identify a mitigating action (420) relating to why the respective processing circuit(s) 330 inaccurately generated an interrupt indicating that clock generation circuit 320 had an error condition. Upon determining this mitigating action, control processing circuit 340 may execute this mitigating action (410).

Alternatively, clock interrupt handler 342B may analyze whether clock generation circuit 320 is accessible (424) and identify that it is not. In response to identifying this, clock interrupt handler 342B may identify whether or not multiple processor circuits 330 identified this same failure (428). Clock interrupt handler 342B may determine whether multiple processor circuits 330 identified this failure by checking on-board memories 332 of all or multiple processing circuits 330. Alternatively, or additionally, clock interrupt handler 342B may determine whether multiple processing circuits 330 identified this failure by verifying if multiple interrupts were received from multiple processing circuits 330. If multiple processing circuits 330 identified this failure, clock interrupt handler 342B may gather all error data from these multiple processing circuits 330 (430), which may include gathering data from on-board memory 332 to identify a mitigating action (408).

If only one of processing circuits 330 identified this failure, clock interrupt handler 342B may attempt to use data of this interrupt/failure to identify a mitigating action (408) to address the error of some of clock generation circuitry 320 not being accessible (as identified at 424) while also invoking chip interrupt handler 342A (426) to identify why the specific processing circuit 330 transmitted an interrupt for the reference clock error, as the reference clock signal error was not replicated across other processing circuits. Once identified, control processing circuit 340 may execute the (se) mitigating action(s) (410). In some examples, cross-verifying error conditions across multiple points of a computing system may create a more resilient system that is less prone to false positives (e.g., identify an error condition where there is no error) and false negatives (e.g., failing to identify a previous or ongoing error condition) in detecting error conditions.

Aspects of the present invention are described herein with reference to flowchart illustrations and/or block diagrams of methods and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   one or more processing circuits configured to run workloads;
   a clock generation circuit that is electrically coupled to each of the one or more processing circuits and configured to generate a reference clock signal for the one or more processing circuits; and
   a control processing circuit that is electrically coupled to each of the one or more processing circuits and clock generation circuit and configured to manage a plurality of interrupts relating to the reference clock signal including a first and second interrupt,
   wherein each of the one or more processing circuits is configured to generate the first interrupt in response to detecting a first reference clock signal error, and
   wherein the clock generation circuit is configured to generate the second interrupt in response to detecting a second reference clock signal error.

2. The system of claim 1, wherein the one or more processing circuits are configured to create a record of the first reference clock signal error within respective on-board memories of the one or more processing circuits.

3. The system of claim 2, wherein the control processing circuit is configured to detect whether a plurality of the one or more processing circuits includes the record of the first reference clock signal in response to receiving the first interrupt but not the second interrupt.

4. The system of claim 1, wherein each of the one or more processing circuits is configured to:
   monitor the reference clock signal;
   identify a failure of the reference clock signal; and
   generate the first interrupt to indicate the error.

5. The system of claim 1, wherein the control processing circuit being configured to manage the plurality of interrupts includes being configured to identify and execute one or more mitigating actions related to the plurality of interrupts.

6. The system of claim 1, wherein the one or more processing circuits are configured to create a record of the first clock in a fault isolation register of the system.

7. The system of claim 1, further comprising a memory in communication with the one or more processing circuits, the memory containing instructions that, when executed by the one or more processing circuits, cause the one or more processing circuits to run the workloads.

8. The system of claim 1, further comprising an input/output bus in communication with the processing circuit and configured to receive instructions that, when executed by the one or more processing circuits, cause the one or more processing circuits to run the workloads.

9. The system of claim 1, wherein the one or more processing circuits are configured to generate the first interrupt such that the first interrupt includes data of the first reference clock signal error.

10. A method comprising:
    receiving, by a control processing circuit that is configured to manage interrupts for a plurality of processing circuits of a computing device, an interrupt from one of the plurality of processing circuits of the computing device, each of the plurality of processing circuits configured to execute workloads using a reference clock signal for synchronizing actions of the plurality of processing circuits;
    identifying, by the control processing circuit, that the interrupt relates to a reference clock signal error for the reference clock signal synchronizing the actions;
    identifying, by the control processing circuit, a cause of the reference clock signal error; and
    executing a mitigating action relating to the cause.

11. The method of claim 10, wherein the processing circuit is a first processing circuit of the plurality of processing circuits of the computing device that each receive the reference clock signal, wherein the identifying the cause further comprises:
    identifying, by the control processing circuit, that the first processing circuit is the only processing circuit of the plurality of processing circuits to identify the reference clock signal error; and
    determining, by the control processing circuit and in response to determining that the first processing circuit is the only processing circuit to identify the reference clock signal error, that the cause of the reference clock signal error is the first processing circuit.

12. The method of claim 10, wherein the identifying the cause of the reference clock signal error includes the control processing circuit checking a fault isolation register of the computing device.

13. The method of claim 10, wherein the identifying the cause of the reference clock signal error includes the control processing circuit checking an on-board memory of each processing circuit that receives the reference clock signal of the computing device.

14. The method of claim 10, wherein the identifying the cause of the reference clock signal error includes the control processing circuit checking if the reference clock generation circuitry is accessible.

15. The method of claim 10, wherein the identifying the cause of the reference clock signal error includes the control processing circuit analyzing data of the reference clock signal error of the interrupt.

16. A processing circuit comprising:
- an input port configured to receive a reference clock signal used to synchronize actions of the processing circuit with a plurality of processing circuits of a computing device;
- a communication port configured to transmit and receive messages;
- detection hardware configured to detect that the reference clock signal indicates an error condition;
- on-board memory that includes a register for the error condition; and
- an interrupt generation circuit configured to generate an interrupt related to the error condition and transmit the interrupt via the communication port to a control processing circuit that handles interrupts for the plurality of processing circuits,
- wherein the processing circuit is configured to execute workloads for the computing device using the reference clock signal in a synchronized fashion with the plurality of other processing circuits that are each configured to execute workloads of the computing device.

17. The processing circuit of claim 16, wherein the communication port is configured for i2c protocol.

18. The processing circuit of claim 16, wherein the detection hardware is configured to record the error condition in the register in response to detecting that the reference clock signal indicates the error condition.

19. The processing circuit of claim 16, wherein the detection hardware is configured to cause the interrupt generation circuit to generate the interrupt in response to detecting that the reference clock signal indicates the error condition.

20. The processing circuit of claim 19, wherein the detection hardware is configured to cause the interrupt generation circuit to generate the interrupt in response to detecting that a global fault isolation register has a record of the error condition.

* * * * *